United States Patent
Kotsuji

(10) Patent No.: US 9,036,172 B2
(45) Date of Patent: May 19, 2015

(54) IMAGE FORMING APPARATUS, IMAGE FORMING METHOD, AND STORAGE MEDIUM

(71) Applicant: Kyocera Document Solutions Inc., Osaka (JP)

(72) Inventor: Takuya Kotsuji, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/266,781

(22) Filed: Apr. 30, 2014

(65) Prior Publication Data

US 2014/0320880 A1    Oct. 30, 2014

(30) Foreign Application Priority Data

Apr. 30, 2013    (JP) .................................. 2013-095787

(51) Int. Cl.
| | | |
|---|---|---|
| *G06F 3/12* | (2006.01) | |
| *G06F 21/62* | (2013.01) | |
| *H04N 1/00* | (2006.01) | |
| *G06F 7/04* | (2006.01) | |
| *G06K 15/00* | (2006.01) | |

(52) U.S. Cl.
CPC .......... *H04N 1/00838* (2013.01); *G06F 3/1222* (2013.01); *G06F 3/1238* (2013.01); *G06K 15/4095* (2013.01); *H04N 2201/0094* (2013.01); *H04N 2201/3212* (2013.01)

(58) Field of Classification Search
CPC ............ H04N 1/0023; H04N 1/00233; H04N 1/00228; H04N 1/00838; H04N 1/00875; H04N 1/00854; H04N 1/00864; H04N 1/00846; H04N 1/4406; H04N 1/4413; H04N 1/1444; G06F 3/126; G06F 3/1285–3/1288; G06F 3/1296; G06F 3/1222; G06F 3/1238; G06F 21/608

USPC ........ 358/1.11–1.18, 400–404; 709/204, 205, 709/213, 217–219, 238; 726/17, 19, 26

See application file for complete search history.

(56) References Cited

U.S. PATENT DOCUMENTS

| | | | |
|---|---|---|---|
| 2004/0194033 A1* | 9/2004 | Holzwarth et al. | 715/530 |
| 2006/0007471 A1* | 1/2006 | Okamoto et al. | 358/1.14 |
| 2008/0104707 A1* | 5/2008 | Saka et al. | 726/26 |
| 2009/0046311 A1* | 2/2009 | Asai | 358/1.9 |
| 2009/0174890 A1* | 7/2009 | Shigehisa et al. | 358/1.14 |
| 2011/0043852 A1* | 2/2011 | Uejo et al. | 358/1.15 |
| 2012/0159618 A1* | 6/2012 | Ohba et al. | 726/19 |

FOREIGN PATENT DOCUMENTS

JP    2008-129941 A    6/2008

* cited by examiner

*Primary Examiner* — Chad Dickerson
(74) *Attorney, Agent, or Firm* — James W. Judge

(57) ABSTRACT

An image forming includes a predetermined-act acquisition unit, an output control unit, and an image forming unit. The predetermined-act acquisition unit is configured to obtain a predetermined act by a user. The output control unit is configured to: output a page of print data where a security has not been set up among pages of the print data where the security has been set up in page units, and permit output of a page of the print data where the security has been set up if the predetermined act has been obtained by the predetermined act acquisition unit within a predetermined standby time. The image forming unit is configured to print a page for which the output has been permitted by the output control unit.

14 Claims, 9 Drawing Sheets

IMAGE FORMING APPARATUS, IMAGE FORMING METHOD, AND STORAGE MEDIUM

CROSS-REFERENCE TO RELATED APPLICATION

This application is based upon, and claims the benefit of priority from, corresponding Japanese Patent Application No. 2013-095787 filed in the Japan Patent Office on Apr. 30, 2013, the entire contents of which are incorporated herein by reference.

BACKGROUND

Unless otherwise indicated herein, the description in this section is not prior art to the claims in this application and is not admitted to be prior art by inclusion in this section.

There is provided an image forming apparatus such as a multifunctional peripheral (MFP), which can print documents and images, have a secure print function. The secure print function can set up security such as password setting on documents of highly confidential setting.

As an image forming apparatus ensuring secure print, a technique that sets a plurality of passwords according to a security level, which is confidential setting, is disclosed. The technique can set up different securities on every page depending on characteristics of confidential document, and can output the documents by printing.

SUMMARY

An image forming according to the disclosure includes a predetermined-act acquisition unit, an output control unit, and an image forming unit. The predetermined-act acquisition unit is configured to obtain a predetermined act by a user. The output control unit is configured to: output a page of print data where a security has not been set up among pages of the print data where the security has been set up in page units, and permit output of a page of the print data where the security has been set up if the predetermined act has been obtained by the predetermined act acquisition unit within a predetermined standby time. The image forming unit is configured to print a page for which the output has been permitted by the output control unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
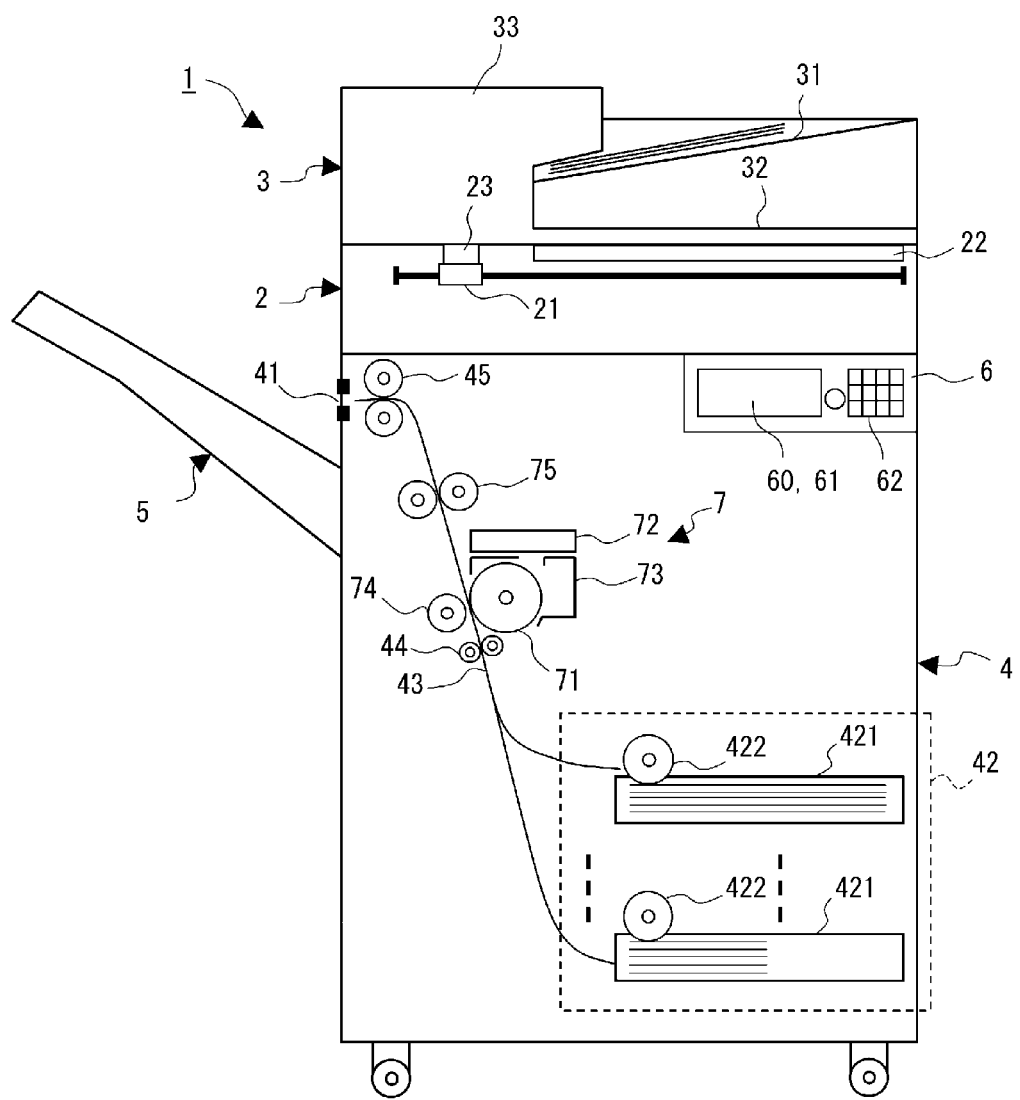
FIG. 1 is a schematic cross-sectional view illustrating an internal configuration according to an embodiment of an image forming apparatus of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Configuration of Image Forming Apparatus 1 According to Embodiment

According to FIG. 1, an image forming apparatus 1 of this embodiment includes a document reading unit 2, a document feeding unit 3, a main unit 4, a stack tray 5, and an operation panel unit 6. The document reading unit 2 is arranged at an upper portion of the main unit 4. The document feeding unit 3 is arranged at an upper portion of the document reading unit 2. The stack tray 5 is arranged at a discharge port 41 for a recording sheet side formed at the main unit 4. The operation panel unit 6 is arranged at a front side of the image forming apparatus 1.

The document reading unit 2 includes a scanner 21, a platen glass 22, and a document reading slit 23. The scanner 21 is constituted of an exposure lamp, a Charge Coupled Device (CCD) and a Complementary Metal Oxide Semiconductor (CMOS) imaging sensors, or a similar component. The scanner 21 is movable to a direction of documents conveyed by the document feeding unit 3. The platen glass 22 is a document table constituted of a transparent member such as a glass. The document reading slit 23 includes a slit formed perpendicular to the direction of the documents conveyed by the document feeding unit 3.

To read documents placed on the platen glass 22, the scanner 21 moves to a position facing the platen glass 22. Then, the scanner 21 reads the documents while scanning the documents placed on the platen glass 22, obtains image data, and outputs the obtained image data to the main unit 4. To read documents conveyed by the document feeding unit 3, the scanner 21 moves to the position facing the document reading slit 23. Then, the scanner 21 reads the documents via the document reading slit 23 synchronizing a conveying operation of the documents by the document feeding unit 3, obtains image data, and outputs the obtained image data to the main unit 4.

The document feeding unit 3 includes a document placing portion 31, a document discharging unit 32, and a document conveying mechanism 33. The document conveying mechanism 33 sequentially feeds documents placed on the document placing portion 31 one by one. The documents are conveyed to the position facing the document reading slit 23, and then are discharged to the document discharging unit 32. The document feeding unit 3 is constituted to be collapsible. Lifting up the document feeding unit 3 causes a top surface of the platen glass 22 to be released.

The main unit 4 includes a paper sheet feeder 42, a paper sheet conveyance passage 43, a conveyance roller 44, and a discharge roller 45 as well as including an image forming unit 7. The paper sheet feeder 42 includes a plurality of sheet feed cassettes 421 and a paper feed roller 422. The sheet feed cassettes 421 store recording sheets of respective different sizes or orientations. The paper feed roller 422 feeds the recording sheets from the sheet feed cassettes 421 one by one to the paper sheet conveyance passage 43. The paper feed roller 422, the conveyance roller 44, and the discharge roller 45 function as a conveying unit. The conveying unit conveys the recording sheets. The conveyance roller 44 conveys the recording sheets fed to the paper sheet conveyance passage 43 by the paper feed roller 422 to the image forming unit 7. Then, the discharge roller 45 discharges the recording sheets recorded by the image forming unit 7 to the stack tray 5.

The operation panel unit 6 includes a display unit 60 (a display unit) and a touch panel 61 for inputting various instructions, a button unit 62, and a similar unit (input unit).

The display unit 60 is a flat display panel such as a Liquid Crystal Display (LCD), an Organic Electro-Luminescence (OEL), and a Field Emission Display (FED), a projector, a status indication LED, or a similar display. The display unit 60 displays various operation screens. The display unit 60 also displays respective settings or a similar state.

The touch panel 61 is a touch panel with a resistance film method and a capacitive touchscreen method. The touch panel 61 detects a coordinate, pressing force, or similar state on the display unit 60 pressed by a user. When a multi-touch-compatible touch panel 61 is used, a plurality of coordinates, pressing forces, or similar state can be detected.

The button unit 62 includes a start key, a numeric keypad, a button for switching an operation mode such as a copy and a scanner, and a button for obtaining a selected instruction regarding print/transmission/reception, or similar operation of a document. The touch panel 61 and the button unit 62 of the operation panel unit 6 function as a user instruction acquisition unit that receives instructions from the user to the image forming apparatus 1. The touch panel 61 and the button unit 62 function as a password input unit from which a password is input.

The image forming unit 7 includes a photoreceptor drum 71, an exposing unit 72, a developing unit 73, a transfer unit 74, and a fixing unit 75. The exposing unit 72 is an optical unit including a laser device, an LED array, a mirror, a lens, and a similar component. The exposing unit 72 outputs light or a similar based on image data to expose the photoreceptor drum 71 and forms an electrostatic latent image on the surface of the photoreceptor drum 71. The developing unit 73 is a developing unit that develops the electrostatic latent image formed on the photoreceptor drum 71 with toner and forms a toner image based on the electrostatic latent image on the photoreceptor drum 71. The transfer unit 74 transfers the toner image formed on the photoreceptor drum 71 by the developing unit 73 to a recording sheet. The fixing unit 75 heats the recording sheet on which the toner image is transferred by the transfer unit 74 and fixes the toner image on the recording sheet.

Figure 2:
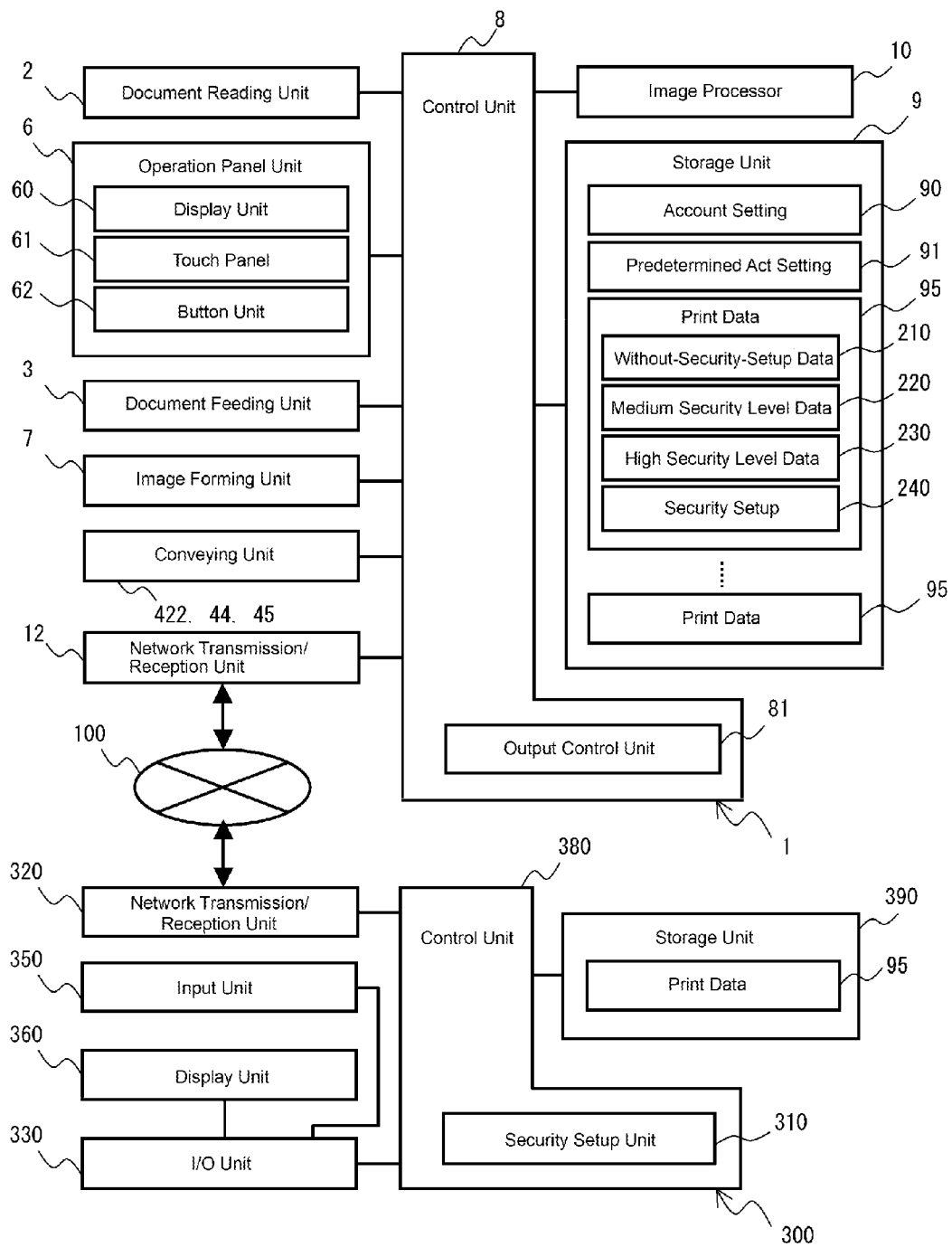
FIG. 2 is a block diagram illustrating a control configuration of the image forming apparatus according to the embodiment of the disclosure.
Figure 3:
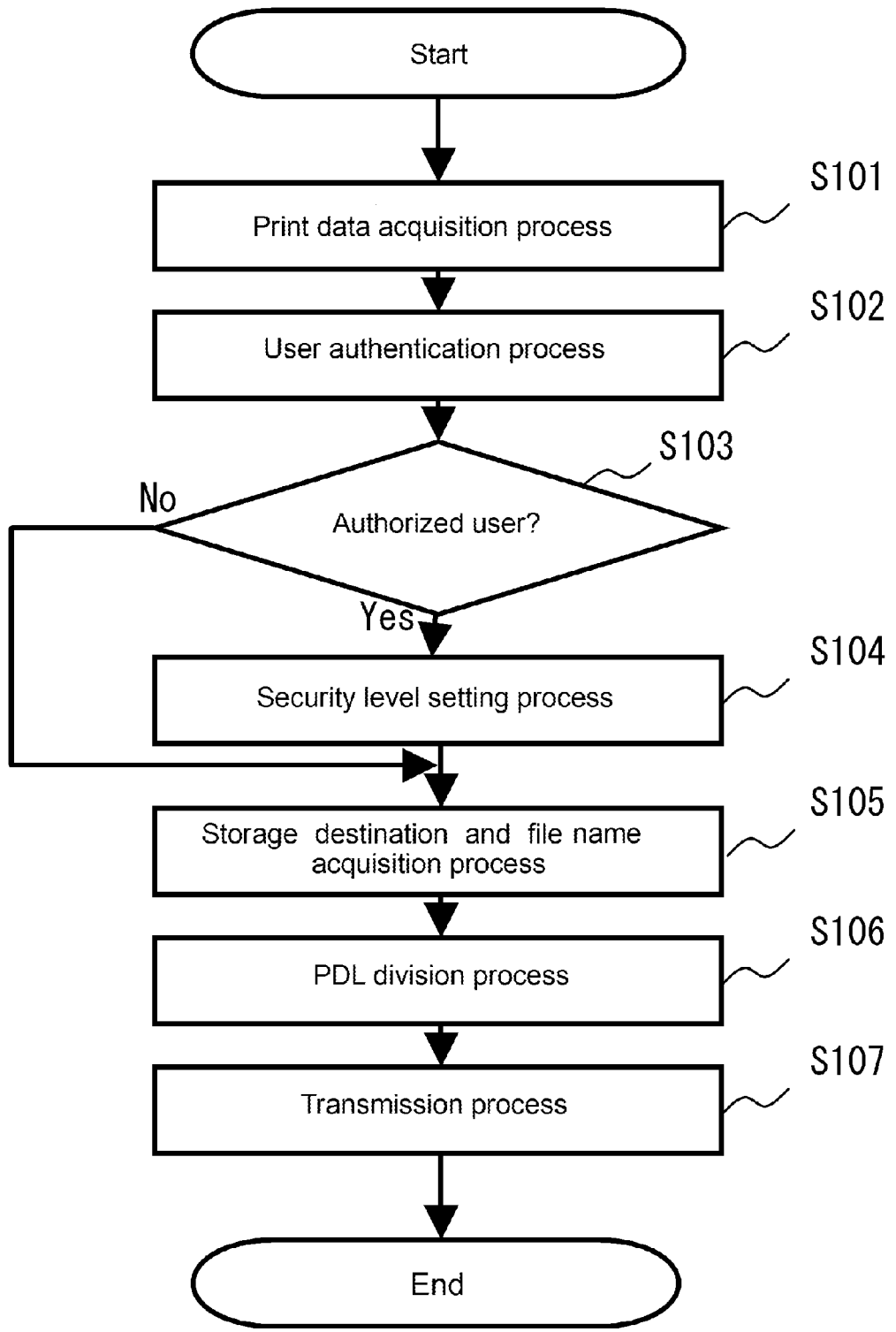
FIG. 3 is a flowchart of a security setup process of a terminal according to the embodiment of the disclosure.

Next, the following describes a control configuration of the image forming apparatus 1 and a terminal 300 according to the embodiment of the disclosure with reference to FIG. 2. The image forming apparatus 1 can transmit and receive various data including print data 95 over a network 100 and can authenticate a job for every user by authorization management. The network 100 is a communication network such as a Wide Area Network (WAN) such as an intranet, a Local Area Network (LAN), and the Internet, an extension network, a mobile phone network, and a PHS network. The terminal 300 is a PC, a Personal Data Assistant (PDA), a smart phone, a digital camera, a smart TV, a game machine, or a similar machine. The terminal 300 can transmit the print data 95 to the image forming apparatus 1. The image forming apparatus 1 and the terminal 300 function as an image forming system.

With reference to FIG. 2, the above-described document reading unit 2, document feeding unit 3, conveying unit (the paper feed roller 422, the conveyance roller 44, the discharge roller 45), operation panel unit 6, and image forming unit 7 (the image formation unit) are connected to a control unit 8. The control unit 8 operates and controls these units. A storage unit 9 (storage unit), an image processor 10, a network transmission/reception unit 12, or a similar unit are connected to the control unit 8.

The control unit 8 is an operation control unit such as a microcomputer that includes a Read Only Memory (ROM), a Random Access Memory (RAM), or a similar memory. The ROM stores a control program for operating and controlling the image forming apparatus 1. The control unit 8 and the image processor 10 read the control program stored in the ROM and load the control program to the RAM. Thus, the control unit 8 controls the entire apparatus according to predetermined instruction information input from the operation panel unit 6 and the terminal 300.

The control unit 8 includes an output control unit 81 (an output control unit, a predetermined act acquisition unit, an output completion screen display unit, a security level setting unit, a password authentication unit, a print data division unit, a list display unit, and a page number change unit). The output control unit 81 stores the print data 95 transmitted from the terminal 300 to the storage unit 9. The output control unit 81 first reassigns pages of the print data 95 without security setup and then prints the print data 95. Then, the output control unit 81 displays an output completion screen on the display unit 60 in the operation panel unit 6. Thus, a user not authorized to print the pages with security setup (hereinafter referred to as "general user") receives a printed matter without security setup. When the output control unit 81 obtains an input of a predetermined operating method (a predetermined act) within predetermined time, the output control unit 81 recognizes that the user is authorized to print the pages with security setup (hereinafter referred to as "authorized user") and permits outputting the pages with security setup. This predetermined act can also obtain an operation performed on the output completion screen by the user as well as predetermined button operations, or a similar operation. The output control unit 81 may authenticate the password after obtaining the predetermined act. Afterwards, the output control unit 81 causes the image forming unit 7 to start printing the pages with security setup. That is, after receiving a printed matter without security setup, the authorized user can further receive a printed matter of high security level. In contrast, since the printed matter without security setup is successfully printed, general users are less likely to notice that there are the pages with security setup on the document. In view of this, possibility of information leakage to a third person can be reduced, thus achieving an effect of ensuring security.

The storage unit 9 is a storage unit using a storage medium such as a semiconductor memory and a Hard Disk Drive (HDD). The storage unit 9 stores image data scanned by the document reading unit 2, image data image-processed by the image processor 10, data of printed document transmitted from the terminal 300 of a user, various files read out from a connected recording medium such as a memory card, or similar data. The storage unit 9 may include a region for a storage folder for every user. Details of data stored in the storage unit 9 will be described later.

The image processor 10 is an operation control unit such as a Digital Signal Processor (DSP) and a Graphics Processing Unit (GPU). The image processor 10 performs a predetermined image process on image data. For example, the image processor 10 performs various image processes such as an image improvement process such as a scaling process, density adjustment, and tone adjustment. The image processor 10 converts an image read by the document reading unit 2 into a file unit in a PDF, TIFF, or a similar format, and stores the image as the print data 95 in the storage unit 9.

The network transmission/reception unit 12 includes a LAN broad, a wireless transceiver, or a similar component for connection to the network 100. The network transmission/reception unit 12 is unit for connection to the external network 100. The network transmission/reception unit 12 is connected to the terminal 300 over the network 100. The network transmission/reception unit 12 receives instructions on the print data 95 and various jobs or a similar instruction from the terminal 300.

The image forming apparatus 1 may integrally form the control unit 8, the image processor 10, or a similar unit like a GPU built-in CPU and a chip-on-module package. The image forming apparatus 1 may include a FAX transmission/reception unit for transmission to and reception from a facsimile.

Configuration of Storage Unit 9

Here, the following describes data stored in the storage unit 9 in detail. The storage unit 9 stores an account setting 90, a predetermined act setting 91, and the print data 95. The storage unit 9 functions as a print data storage unit that stores the print data 95. The storage unit 9 functions as a security-setup-sorted data storage unit that stores without-security-setup data 210, medium security level data 220, and high security level data 230 as security-setup-sorted data.

The account setting 90 is a database that includes attribute information such as a user ID (Identification, a user name), a password, authority information, and an IP address of the terminal 300, and a mail address for every user account. The user ID and the password of the account setting 90 are used to log in to the image forming apparatus 1. The authority information of the account setting 90 includes information on authority of whether print, transmission, browse, or a similar operation on highly confidential document with security setup can be executed or not, that is, a class of "general user" and "authorized user." The authority information also includes information such as information on authority of up to which stage the security level can be set. The account setting 90 is registered using various information input from the operation panel unit 6 and the terminal 300 by the user.

The predetermined act setting 91 is data to which a predetermined act to be performed by the authorized user before password authentication is set. The predetermined act is an act inferred that general users do not usually perform. The predetermined act setting 91 can register predetermined acts, for example, "touch upper right of check box", "repeatedly strike cancel button five times", and "press arrow buttons in an order of up, up, down, down, right, and left" in a format such as a "macro" corresponding to respective operations from the touch panel 61 and the button unit 62 in the operation panel unit 6.

The print data 95 is a print file transmitted from the terminal 300 connected via the network transmission/reception unit 12, a file stored in the storage folder of the storage unit 9, a file obtained from an external recording medium, a file received via facsimile, a scan image file read by the document reading unit 2, or a similar file.

The print data 95 includes the without-security-setup data 210, the medium security level data 220, and the high security level data 230. The print data 95 also includes a security setup 240.

The without-security-setup data 210 is data in Page Description Language (PDL) such as PostScript (registered trademark) or similar data for pages where a security level is not set, which can be printed by general users. The medium security level data 220 is data in PDL or similar data for pages in a medium security level for an authorized user. The high security level data 230 is PDL data for pages in a high security level for the authorized user. The high security level data 230 has a higher stage of security level than the medium security level data 220. That is, the high security level data 230 is highly confidential compared with the medium security level data 220. The security setup 240 is various settings data that includes encrypted passwords in units of security levels, page numbers of respective pages, print quality such as a resolution, color, and monochrome, automatic output setting, predetermined time until a predetermined act is obtained, a storage destination of the print data 95 in the image forming apparatus 1, a file name of the print data 95, an encryption key for encrypting the passwords, charging information, or similar information. The automatic output setting sets whether to automatically print pages with a lower security level than user authority or not. The security setup 240 itself may be encrypted.

The medium security level data 220 and the high security level data 230 are printed after output of the without-security-setup data 210 only when the predetermined acts are obtained within predetermined time. In this respect, only the predetermined act, which will be described later, can authenticate the medium security level data 220. That is, a password may not be set to the medium security level data 220. The high security level data 230 is printed after the predetermined act when a password set corresponding to the security level is further authenticated. The medium security level data 220 and the high security level data 230 may be encrypted in units of a plurality of security levels with password, an encryption key, or a similar method. A plurality of security levels may further divide the medium security level data 220 and the high security level data 230. That is, this embodiment categorizes the security levels into none, intermediate, and high. However, this should not be construed in a limiting sense. A plurality of stages of security levels may be set. Passwords may be set for respective low security level to high security level. Alternatively, PDL for the print data 95 may not be divided, but the security setup 240 may include only page numbers of respectively security levels.

Configuration of Terminal 300

With reference to FIG. 2, the terminal 300 includes a network transmission/reception unit 320, an I/O unit 330, an input unit 350, a display unit 360, a control unit 380, and a storage unit 390.

The network transmission/reception unit 320 is a LAN interface, a wireless LAN interface, a mobile radio wave transmission/reception device, or a similar interface in a standard such as 1000 BASE-T/100 BASE-TX for connection to the network 100. The terminal 300 can transmit and receive the print data 95, a user ID and a password for login, or similar information via the network transmission/reception unit 320. The network transmission/reception unit 320 may be connected to an external hub, a router, or a similar device for connection to the network 100.

The I/O unit 330 is a configuration part to provide an interface for connection to various peripherals, such as a DVI, an analog RGB, an HDMI (registered trademark), a USB, IEEE1394, a serial, a parallel, an infrared, or a wireless. The I/O unit 330 is connected to the input unit 350 and the display unit 360.

The input unit 350 is an input part, such as a keyboard, a computer mouse, a touch panel, and a touch pad, to input information such as various settings and user authentication.

The display unit 360 is a display unit part such as an LCD display and an organic EL display. The display unit 360 can display screens for drawing of application software and security setup or a similar display.

The control unit 380 is a control unit with operation and control capability such as a Central Processing Unit, (CPU), a Micro Processing Unit (MPU), a Digital Signal Processor (DSP), a Graphics Processing Unit (GPU), an Application Specific Processor (ASIC). The control unit 380 executes respective programs stored in the storage unit 390 with hardware resources.

The control unit 380 includes a security setup unit 310. The security setup unit 310 obtains a user instruction. The security setup unit 310 then converts raw data for drawing spooled during printing of various application software into the print data 95 in a PDL format where image formation with the image forming apparatus 1 is possible using a print device driver (Driver) program for the image forming apparatus 1 or a similar program. Then, the security setup unit 310 sets up security on the print data 95 and divides the PDL data corresponding to respective security levels. The security setup unit 310 transmits data in an order from PDL data without security setup and PDL data of low security level to PDL data of high security level from the network transmission/reception unit 320 to the image forming apparatus 1 over the network 100. The control unit 380 executes a program such as a device driver for the image forming apparatus 1 stored in the storage unit 390, thus the security setup unit 310 is achieved.

The storage unit 390 is a storage unit such as a flash memory disk of a Random Access Memory (RAM), a Solid State Drive (SSD), or a similar memory, a Hard Disk Drive (HDD), a magnetic tape unit, and an optical disk unit. In addition to an Operating System (OS) with a Graphical User Interface (GUI) for functioning the terminal 300 as a computer, the storage unit 390 stores application software such as a word processor, a spreadsheet program, drawing software, WWW browser, and an e-mailer and other programs and data. The control unit 380 can read and write these programs and data. The storage unit 390 once stores the print data 95 created by the security setup unit 310. This print data 95 is mainly transmitted to the image forming apparatus 1 and is stored in the image forming apparatus 1.

Security Setup Process by Terminal 300

Here, with reference to FIGS. 3 to 6, the following describes a security setup process by the terminal 300 according to the embodiment of the disclosure. This security setup process is mainly achieved by the security setup unit 310 of the control unit 380. The control unit 380 performs a program or data stored in the storage unit 390 of the terminal 300 using hardware resources. The following describes respective steps of the security setup process in detail with reference to the flowchart in FIG. 3.

Step S101

First, the security setup unit 310 of the terminal 300 performs a print data acquisition process. For example, when "print" at the image forming apparatus 1 is selected from application software on the OS of the terminal 300, data drawn by the application software is transmitted to the security setup unit 310. The security setup unit 310 obtains the drawn data and converts the data into the print data 95 such as PDL data in every page.

Step S102

Next, the security setup unit 310 performs a user authentication process. When the user selects "security setup" on the GUI of the device driver, the security setup unit 310 performs user authentication. The security setup unit 310 displays a dialogue or a similar screen on the display unit 360 and prompts the user to input a user ID and a password. The security setup unit 310 obtains the user ID and the password from the input unit 350. The security setup unit 310 logs in to the image forming apparatus 1 via the network 100 and transmits the obtained ID and password. The output control unit 81 refers to authentication information of the account setting 90 on the input user ID and password and authenticates the user. The output control unit 81 transmits an authentication result to the terminal 300. The terminal 300 may store the authentication information, and the security setup unit 310 may perform authentication. The terminal 300 may perform authentication on a recording medium such as an IC card of the user on which authentication information is recorded. Alternatively, the terminal 300 may perform signature authentication, biometrics authentication, or similar authentication.

Step S103

Next, the security setup unit 310 determines whether the input user ID is an authorized user or not based on the received authentication result. If the authorized user is authenticated, the security setup unit 310 determines "Yes." Except for that, the security setup unit 310 determines "No." When determining "Yes," the security setup unit 310 proceeds the process to Step S104. When determining "No," the security setup unit 310 proceeds the process to Step S105. In this case, the password setting or similar setting is not performed.

Step S104

Figure 4:
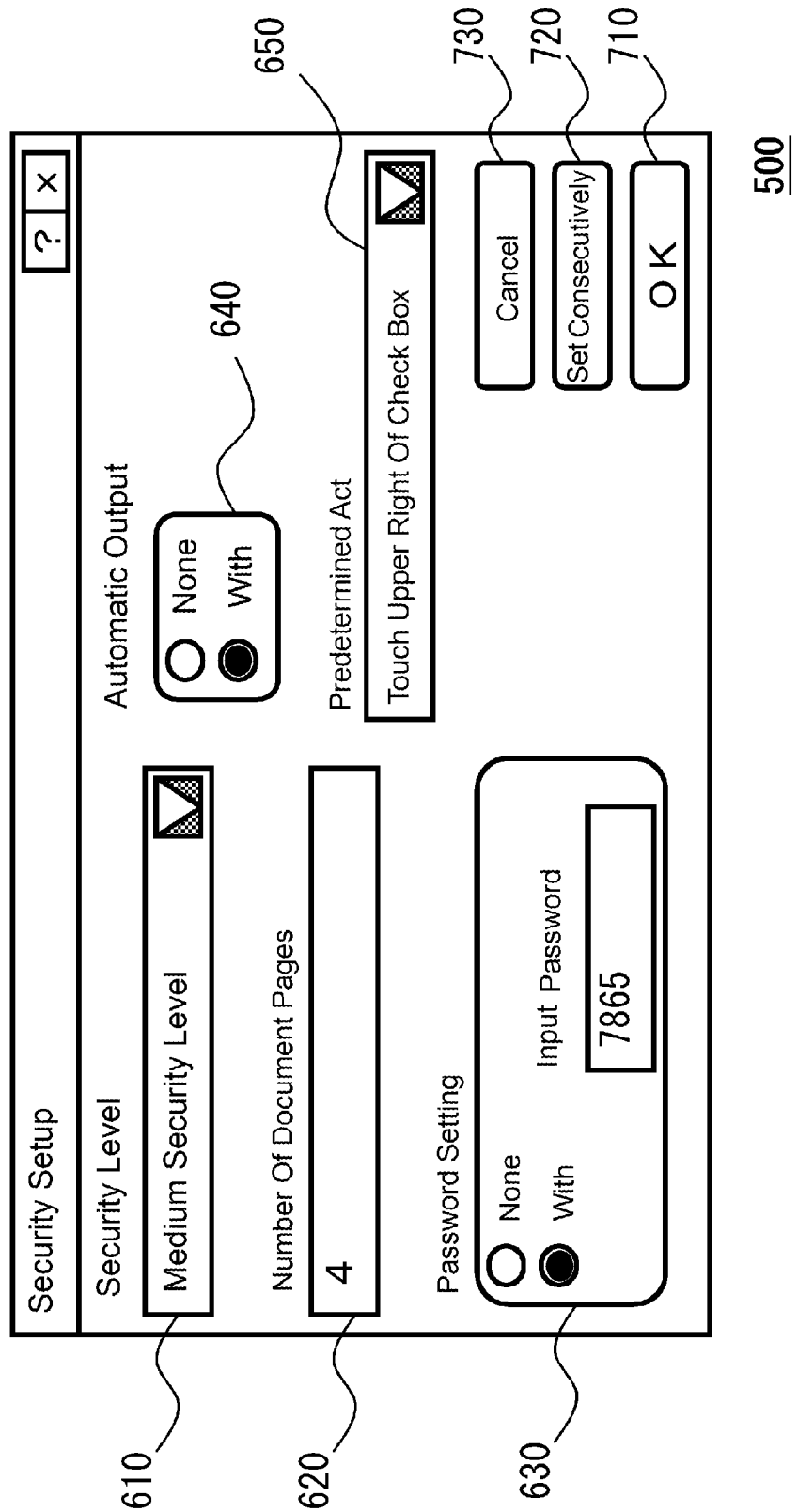
FIG. 4 is a screen example of a setting screen for a security level setting process according to the embodiment of the disclosure.

If the authorized user is authenticated, the security setup unit 310 performs a security level setting process. The following describes the security level setting process with reference to FIGS. 4 and 5. With the example of FIG. 4, the security setup unit 310 displays a screen example 500 on the display unit 360. The screen example 500 is a setting screen for setting up security to the print data 95. The security setup unit 310 sets up security on respective pages of the print data 95, and further sets the security level and password in the setting screen. A display field 610 in FIG. 4 is a field for selecting the security level by a method such as a pull-down menu. At the display field 610, in this example, a security-off setting (deselected), a medium security level, and a high security level can be selected. A display field 620 is a field where a form such as the number of pages is to be input. A page to which the security is to be set up can be input to this field with number and by specifying a range for selection. A display field 630 is a field that includes check boxes, an input form, or a similar item for setting a password. In this field, the user selects "None" to set a password without the security setup. To set a password in the medium security level or the high security level, the user selects "With" for the password. A password to be set to each of the security levels is input to the password input field. When not inputting the password although setting the high security level at the display field 610, the user may change the security level to without security setup or the medium security level at the display field 610. In contrast, when inputting the password without security setup, the user can change the security level to the medium security level at the display field 610. A display field 640 displays check boxes or a similar item for selecting "None" or "With" for automatic output. The automatic output (hereinafter referred to as "automatic output") is a setting that automatically outputs pages with security level setting in a stage of equal to or lower than a security level whose higher stage password matches. That is, the user can specify selection of whether the password is input every time or the corresponding pages are automatically output in the field. Selection of "None" for automatic output requires inputting password every time. Selection of "With" automatically outputs pages with security level lower than the security level for the input password. When passwords are set for the respective medium security level and high security level, if the authorized user is authenticated at the high security level, the automatic output performs the predetermined act for the medium security level and eliminates the need for inputting the password, thus reducing work. A display field 650 is a field of a pull-down menu or a similar menu to which a predetermined act is to be input. The security setup unit 310 obtains the predetermined act preliminarily registered in the predetermined act setting 91 of the storage unit 9 in the image forming apparatus 1 and displays the predetermined act at the display field 650. The user can select a desired act among the displayed predetermined acts. When a password is set, selecting "None" inputs the password after a predetermined output delay time has passed. A button 710 is a button that is pressed at termination of the security setup. Pressing the button 710 causes the security setup unit 310 to display a confirmation screen, which will be described with FIG. 5, on the display unit 360. A button 720 is a button that is pressed when another security level is set. Pressing the button 720 causes the security setup unit 310 to perform setup on other pages or similar. A button 730 is a button that is pressed to cancel setting of the security level or a similar setting. Pressing the button 730 causes the security setup unit 310 to abort the security level setting process so as not to change the security setup 240.

Figure 5:
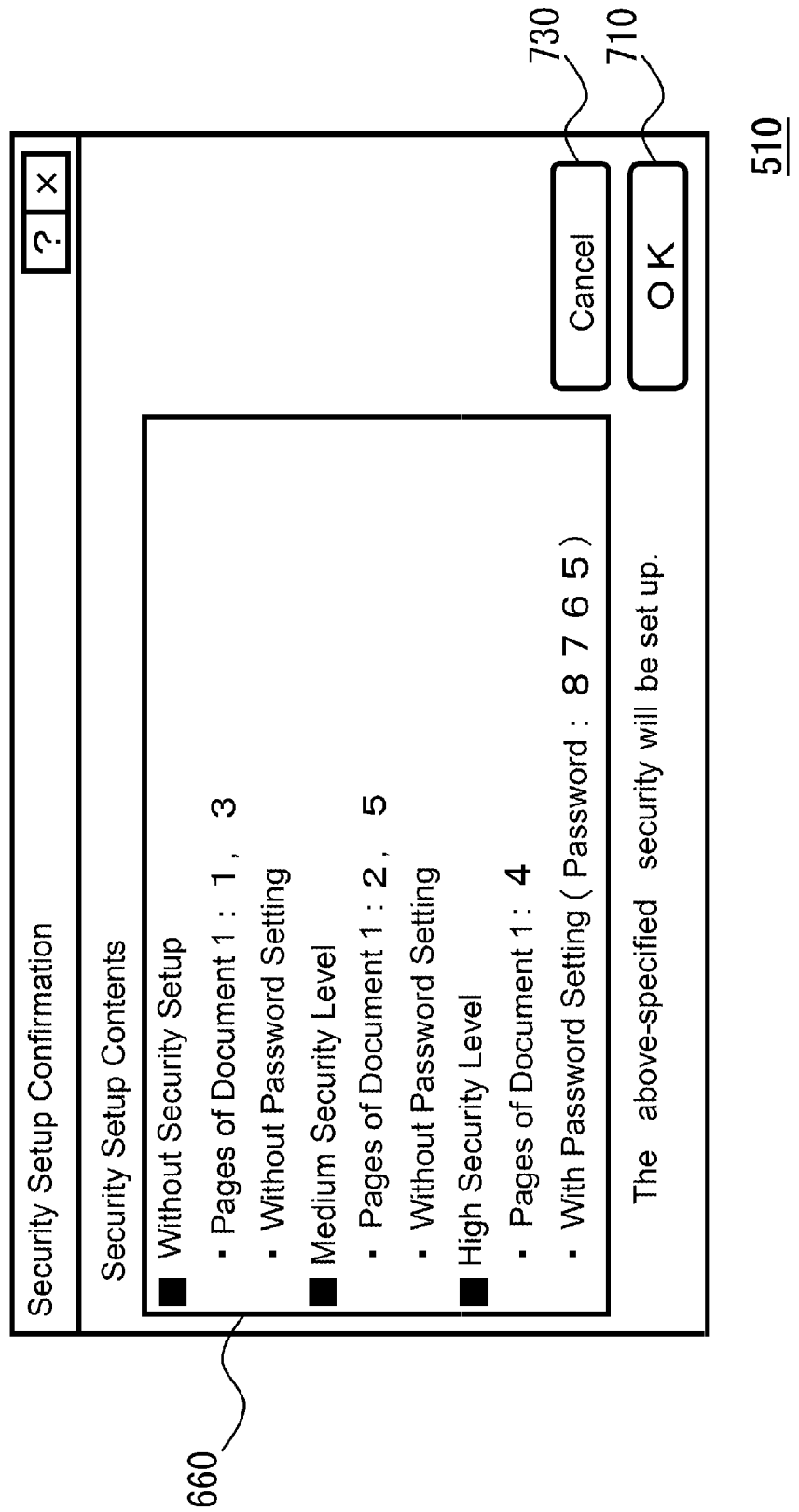
FIG. 5 is a screen example of a confirmation screen for the security level setting process according to the embodiment of the disclosure.
Figure 6:
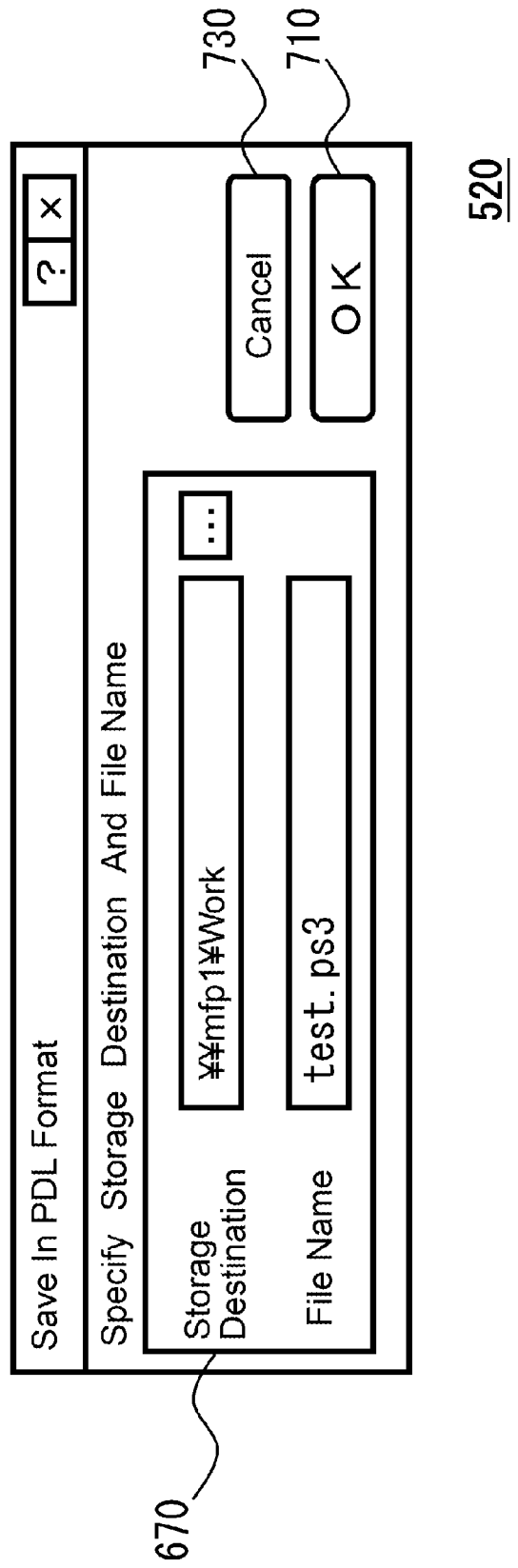
FIG. 6 is a screen example of a storage destination input screen for a storage destination and file name acquisition process according to the embodiment of the disclosure.

With reference to a screen example 510 in FIG. 5, after setting up the security on respectively pages, the security setup unit 310 causes the display unit 360 to display contents of the security setup 240 in the print data 95 as the confirmation screen. A display field 660 displays the security levels of respective pages, a password, or similar information. In this example, in a five-page document, P1 and 3 are set as pages without security setup, P2 and 5 are set as pages with the medium security level, and P4 is set as a page with the high security level. A password "8765" is also set to the page with the high security level. Pressing the OK button 710 causes the security setup unit 310 to set the security setup 240 for the print data 95 and terminates the security level setting process. Pressing the Cancel button 730 causes the security setup unit 310 to return to the setting screen. This ensures further changing and adding the security setup contents of respective pages.

Step S105

Here, the security setup unit 310 performs a storage destination and a file name acquisition process. The following describes with reference to a screen example 520 in FIG. 6. First, the security setup unit 310 displays a storage destination input screen on the display unit 360. The user inputs a storage destination and a file name of the print data 95 to the storage destination input screen. A display field 670 is a form for specifying an address, a storage folder name, and a file name of the image forming apparatus 1, which is a storage destination (a transmission destination) of the print data 95 for storage in PDL. Pressing the OK button 710 causes the security setup unit 310 to divide and encrypt the print data 95, or perform a similar operation based on the security setup 240. Pressing the cancel button 730 causes the security setup unit 310 to return to the setting screen again.

Step S106

Next, the security setup unit 310 performs a PDL division process. After obtaining the storage destination and the file name of the print data 95 from the user, the security setup unit 310 divides the print data 95 into security-setup-sorted data corresponding to security levels based on the security setup 240. In this embodiment, the security setup unit 310 divides the print data 95 into the without-security-setup data 210, the medium security level data 220, and the high security level data 230. In the example of FIG. 5, the security setup unit 310 divides the PDL of the print data 95 as follows. Without-security-setup data 210 includes P1 and P3, the medium security level data 220 includes P2 and P5, and the high security level data 230 includes P4, respectively. In this respect, the security setup unit 310 provides file names of the divided PDL data in an order from PDL data without security setup and PDL data of low security level to PDL data of high security level. For example, like the example in FIG. 5, assume the case where the user-specified file name is "test. ps3." The security setup unit 310 provides file names "test_security0. ps3" to the without-security-setup data 210, "test_security1. ps3" to the medium security level data 220, and "test_security2. ps3" to the high security level data 230. The security setup unit 310 encrypts respective divided data with a password and an encryption key of the security setup 240 when necessary. Thus, the security setup unit 310 can transmit data in the order from data without security setup and data with low security level to data with high security level to the terminal 300. Accordingly, the image forming apparatus 1 can print data starting from one without security setup. Thus, storing data in the PDL format disables for general users to easily browse document contents, ensuring enhancing security. The security setup unit 310 may not divide the PDL of the print data 95 but may convert the PDL into data in different formats.

Step S107

Next, the security setup unit 310 performs a transmission process. After conversion of the PDL of the print data 95 into different data corresponding to security level, the security setup unit 310 transmits the print data 95 from the network transmission/reception unit 320 to the image forming apparatus 1. The output control unit 81 of the image forming apparatus 1 that has received the print data 95 causes the storage unit 9 specified as the storage destination to store the print data 95. The output control unit 81 may obtain the print data 95 in a state not divided corresponding to the security level, may divide the PDL corresponding to the security level as described above, and may store the print data 95 in the storage unit 9. Now the security setup process according to the embodiment of the disclosure is terminated.

Security Print Process by Image Forming Apparatus 1

Figure 7:
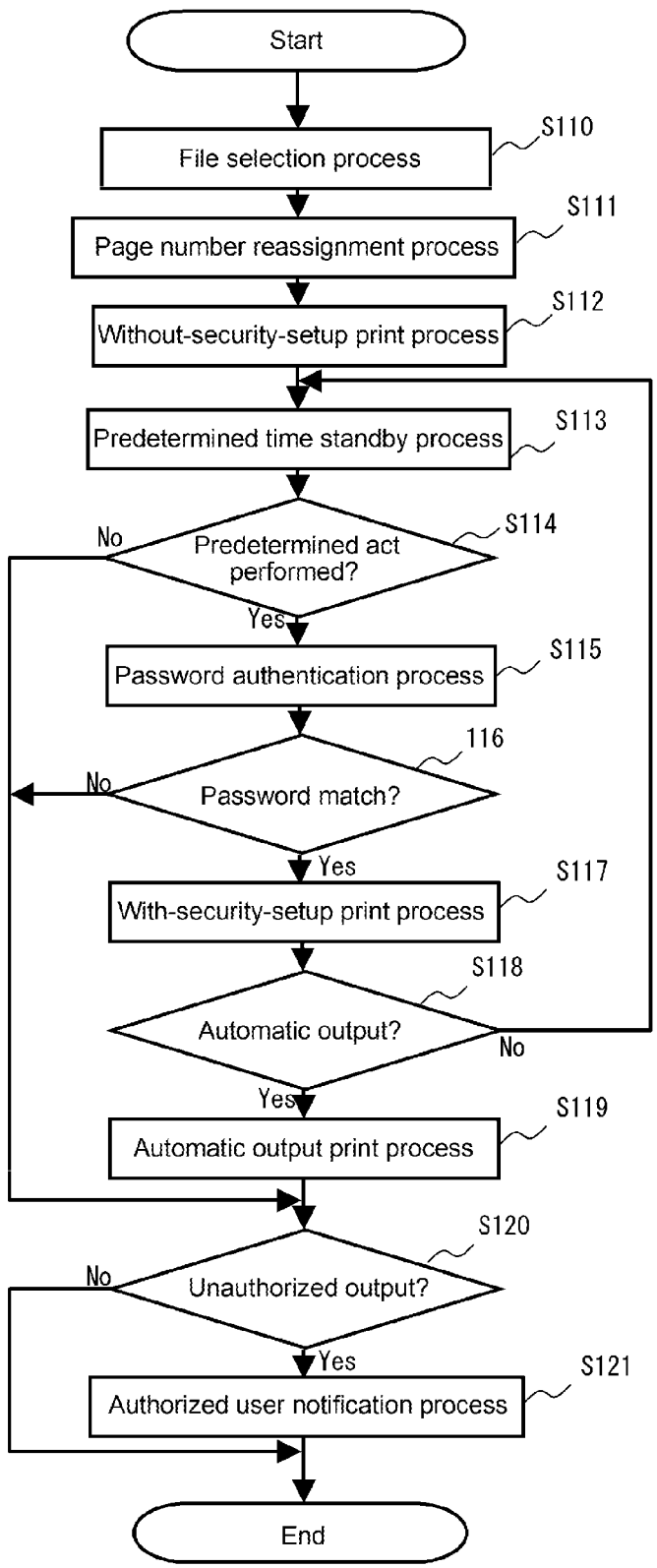
FIG. 7 is a flowchart for a security print process of the image forming apparatus according to the embodiment of the disclosure.
Figure 8:
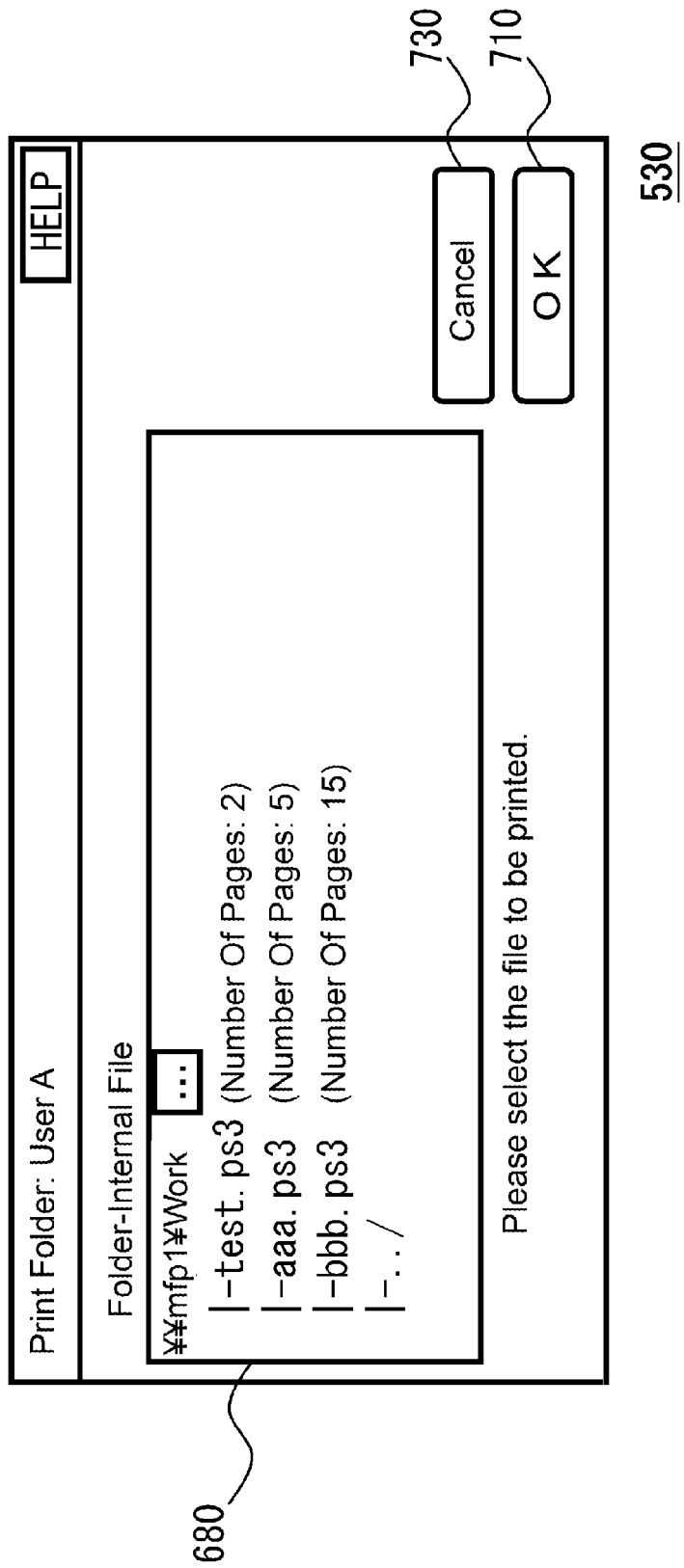
FIG. 8 is a screen example of a folder-internal file selection screen for a file selection process according to the embodiment of the disclosure.
Figure 9:
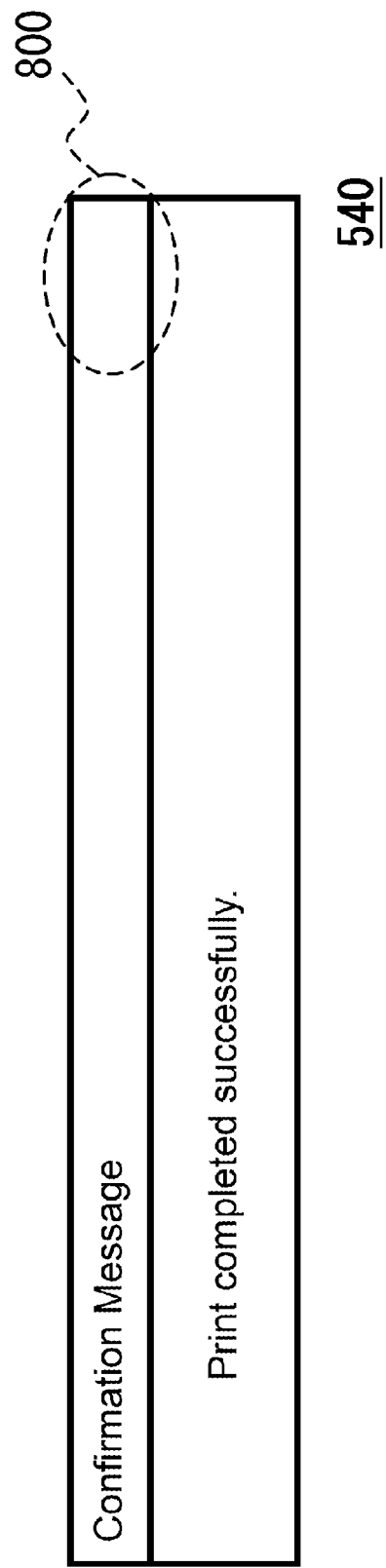
FIG. 9 is a screen example of a confirmation message display screen for output delay or a predetermined act standby process according to the embodiment of the disclosure.

Here, with reference to FIGS. 7 to 9, the following describes a security print process by the image forming apparatus 1 according to the embodiment of the disclosure. The control unit 8 mainly executes a program or similar data stored in the storage unit 9 collaborating with respective units using hardware resources. Thus, the security print process is achieved. The following describes an overview of the security print process in respective steps with reference to the flowchart in FIG. 7.

Step S110

First, the output control unit 81 performs a file selection process. When a specific user prints the print data 95, the output control unit 81 first prompts the user to input the user ID and then performs user authentication by confirmation at the account setting 90. Guests are not required to input a user ID or similar information. Then, when a "saved document print" function is selected with the touch panel 61 and/or the button unit 62 of the operation panel unit 6, the output control unit 81 first prompts the user to select the saved print data 95.

Describing with reference to FIG. 8, the output control unit 81 causes the display unit 60 of the operation panel unit 6 to display a screen example 530, which is a folder-internal file selection screen. The output control unit 81 displays file names of the print data 95 stored in the storage unit 9 in a list in this screen. The output control unit 81 prompts the user to select a file to be printed with the touch panel 61 and/or the button unit 62. A display field 680 is a form for selecting the print data 95 in a format like a so-called filer. The output control unit 81 obtains the list of the without-security-setup data 210 and displays the file name of the print data 95 specified by the user corresponding to the without-security-setup data 210. That is, the output control unit 81 does not display the file names of the above-described respective divided data. This ensures preventing a situation that general users recognize existence of pages with security setup or similar information. Selecting the file to be printed and pressing the OK button 710 causes the output control unit 81 to complete selection of the print data 95 and terminates the file selection process. Pressing the cancel button 730 causes the output control unit 81 to cancel the file selection process, and printing is not performed.

The output control unit 81 can confirm whether the selected file is a desired file or not using free software such as GS, which displays a PostScript format file. In this case, the output control unit 81 can specify a user-specified file name of the without-security-setup data 210 in the storage unit 9 by symbolic link or a similar method. Furthermore, the terminal 300 can perform this confirmation. The output control unit 81 can cause the authorized user to browse the print data 95 where security is partially provided with special software.

Step S111

Next, the output control unit 81 performs a page number reassignment process. The output control unit 81 reassigns the page numbers in an order from the without-security-setup data 210, the medium security level data 220, and the high security level data 230 of the print data 95. Here, the output control unit 81 changes the page numbers of the without-security-setup data 210 to consecutive page numbers. That is, in the print data 95 like the example in FIG. 5, the output control unit 81 changes the page numbers of the PDL data so that P1 of the without-security-setup data 210 is output as the first page and P3 is output as the second page. Thus, since page numbers of a printed matter of the without-security-setup data 210 are output consecutively, general users are less likely to notice that there is another page with high security.

The output control unit 81 can change the respective page numbers of the medium security level data 220 and the high security level data 230 so as to be the original page number orders. That is, the output control unit 81 can reassign the page numbers so that the page numbers of the medium security level data 220 and the high security level data 230 may be inserted within the reassigned page numbers of the without-security-setup data 210. For example, the output control unit 81 changes the page numbers of PDL data P2 of the medium security level data 220 is set to "1-1" page and P5 is "2-2" page so as to find the number of pages to be inserted. Similarly, the output control unit 81 can change the page numbers of PDL data, like P4 of the high security level data 230 being set to "2-1" page.

Step S112

Next, the output control unit 81 performs a without-security-setup print process. The output control unit 81 prints data printable by general users, which is data where password authentication and output delay are not required. In this example, the output control unit 81 outputs the without-security-setup data 210 of the print data 95 from the image forming unit 7 and performs print. The output control unit 81 may output the without-security-setup data 210 by facsimile transmission, PDF file creation, recording to a recording medium, file transmission to the terminal 300, or a similar operation. The same goes for the following respective output processes.

Step S113

Next, the output control unit 81 performs a predetermined time standby process. Describing with reference to a screen example 540 in FIG. 9, first, after output of the without-security-setup data 210, the output control unit 81 displays an output completion screen indicating like "Print completed successfully." on the display unit 60 of the operation panel unit 6. Accordingly, a general user takes and leaves only the printed matter with pages corresponding to the without-security-setup data 210. Since the page numbers are reassigned and print is successfully completed, the general user does not notice existence of a page with security setup.

On the other hand, the output control unit 81 refers to the security setup 240 and if found that there is the medium security level data 220 or the high security level data 230, the output control unit 81 obtains the medium security level data 220 or the high security level data 230 when a predetermined act is performed within the predetermined time set to the security setup 240. At this time, the output control unit 81 can obtain an operation performed on the output completion screen. In the example of FIG. 9, for example, when the user touches a position 800 with the predetermined act of "Touch Upper Right Of Check Box" set, the output control unit 81 detects that the predetermined act is performed.

After elapse of the predetermined time from the without-security-setup print process, the output control unit 81 may delete the medium security level data 220 or the high security level data 230. This ensures reducing possibility for general users to recognize existence of pages with different security level, achieving reduction of risk of an information leakage. In contrast, after elapse of predetermined time, the output control unit 81 may delete the without-security-setup data 210. In this case, general users cannot browse the print data 95 in the above-described file selection process, and the print data 95 cannot be selected unless the user is the authorized user. The authorized user can select the medium security level data 220 or the high security level data 230 of the print data 95 through inputting the user ID, the password, or similar information.

Step S114

Next, the output control unit 81 determines whether a predetermined act is performed or not. When the medium security level data 220 or the high security level data 230 is present and the predetermined act is performed, the output control unit 81 determines "Yes." Except for that, the output control unit 81 determines "No." When determining "Yes," the output control unit 81 proceeds the process to Step S115. When determining "No," the output control unit 81 proceeds the process to Step S120.

Step S115

Next, the output control unit 81 performs a password authentication process. When a password is set to the medium security level data 220 or the high security level data 230, the output control unit 81 prompts the user to input a password or similar information with the touch panel 61 and/or the button unit 62 of the operation panel unit 6 or a similar tool. The output control unit 81 confirms the input password or similar input data at the security setup 240.

Step S116

Next, the output control unit 81 determines whether the input password is correct or not. When a password corresponding to any of the security levels established to the security setup 240 is input and the input password is correct, the output control unit 81 determines "Yes." When a password is not set to the medium security level data 220, the output control unit 81 also determines "Yes." Except for that, the output control unit 81 determines "No." When determining "Yes," the output control unit 81 proceeds the process to Step S117. When determining "No," the output control unit 81 proceeds the process to Step S120.

Step S117

When the medium security level data 220 or the high security level data 230 is present and the input password is correct or a password is not set, the output control unit 81 performs a with-security-setup print process. Here, the output control unit 81 outputs pages included in the medium security level data 220 or the high security level data 230 corresponding to the input password from the image forming unit 7 and prints the corresponding pages. Thus, the authorized user obtains the printed matter with security setup after obtaining the printed matter without security setup and then leaves.

Step S118

Next, the output control unit 81 determines whether automatic output is set or not. When automatic output is set to the security setup 240 of the print data 95, the output control unit 81 determines "Yes." Except for that, the output control unit 81 determines "No." When determining "Yes," the output control unit 81 proceeds the process to Step S119. When determining "No," the output control unit 81 returns the process to Step S113. Then, if pages to be printed in another security level still remains, the output control unit 81 stands by until the predetermined act is input within the predetermined time. The output control unit 81 can also prompt the user to select the next password or similar information immediately. If pages to be printed do not exist in other security levels, the process proceeds to Step S120.

Step S119

Next, the output control unit 81 performs an automatic output print process. With automatic output set, the output control unit 81 automatically outputs pages of equal to or lower than the security level password-authenticated by the user. In this example, when a password is set to the high security level data 230, the medium security level data 220 is immediately output. For example, in the example in FIG. 5, when the user inputs the password set to the high security level data 230, "8765", the output control unit 81 automatically outputs the medium security level data 220 immediately. When a plurality of security levels and passwords are set to the high security level data 230, the output control unit 81 also outputs all data of lower security level than the security level corresponding to the input password.

Step S120

Next, the output control unit 81 determines whether a general user performs unauthorized output or not. Assume that even when a user ID that has logged in to the image forming apparatus 1 is not an authorized user to output the pages with security setup, the output control unit 81 obtains the predetermined act and the medium security level data 220 or the high security level data 230 is output. In this case, since it is inferred that a general user illegally obtains the predetermined act and the password, the output control unit 81 determines "Yes." The output control unit 81 may determine "Yes" by detecting an illegal output from information of the user ID logged in to the image forming apparatus 1 and the printed matter. Except for that, the output control unit 81 determines "No." When determining "Yes," the output control unit 81 proceeds the process to Step S121. When determining "No," the output control unit 81 terminates the security print process.

Step S121

When detecting an unauthorized print by a general user, the output control unit 81 performs an authorized user notification process. The output control unit 81 refers to the account setting 90 and the security setup 240 and notifies the authorized user of unauthorized print with an e-mail or a similar method. The output control unit 81 describes the user ID of the login general user, the output file name, the output time, the output page numbers, or similar information in the e-mail.

Now the security print process according to the embodiment of the disclosure is terminated.

To summarize the above, in the embodiment of the security setup for the terminal 300 and the image forming apparatus 1 of the disclosure, jobs are divided depending on security level, the jobs are transmitted to the image forming apparatus 1 in the order from pages without security setup and pages with low security level to pages with high security level. A difference in operations between the general user and the authorized user is as follows.

i) General user: takes a printed matter with pages without security setup and completes the process.

ii) Authorized user: takes a printed matter with pages without security setup, and then inputs a predetermined act within predetermined time, and further inputs a password if necessary. This starts printing the pages with security setup, after termination of the printing, the user takes the printed matter with security setup and completes the process. Thus, since the pages without security setup are successfully printed, general users do not notice that there are the pages with security setup. Accordingly, the security is secured.

The above-described configuration can obtain the following effects. The image forming apparatus 1 of the disclosure is enabled to set up security in the print data 95 in page units, and permit or not permit output of the print data 95 in page units according to the security setup. The image forming apparatus 1 includes the output control unit 81 and the image forming unit 7. The output control unit 81 obtains a predetermined act by a user and outputs pages of the print data 95 where the security has not been set up, and to permit output of pages of the print data 95 where the security has been set up if the predetermined act has been obtained within a predetermined standby time. The image forming unit 7 is configured to print pages for which output has been permitted by the output control unit 81. This configuration ensures obtaining individual output results by the user even in the same document. In view of this, even if a document including pages with high security level is output, general users are less likely to notice the fact. Accordingly, a risk of a leakage of contents of a document with high security level to the third person can be reduced. Since this eliminates the need for creating documents of different security levels for respective general user and authorized user, this can reduce work by the user and can save toner and paper sheets, achieving reducing the cost.

With the image forming apparatus 1 of the disclosure, the output control unit 81 displays an output completion screen after the without-security-setup data 210 is output. This configuration displays the confirmation screen after printing the without-security-setup data 210. This induces general users to think that a print has been already completed, thus ensuring reducing the risk of a password leakage to general users.

With the image forming apparatus 1 of the disclosure, the output control unit 81 obtains an operation that a user performs on the output completion screen as the predetermined act. This configuration can set an act that is not a simple act such as pressing a button as a trigger to print the pages with security setup. Accordingly, a leakage of confidential information to general users can further be avoided.

The image forming apparatus 1 of the disclosure permits output of the medium security level data 220 and the high security level data 230 if the output control unit 81 obtains the predetermined act by the user, authenticates a password for a higher security level, outputs the without-security-setup data 210, and the password has been authenticated after the predetermined act is obtained. This configuration can reduce a risk that a general user obtains a document with high security level by mistake, ensuring reducing a risk of a leakage of confidential information to the third person.

The image forming apparatus 1 of the disclosure is enabled to permit or not permit output according to the security level. The image forming apparatus 1 includes the storage unit 9. The storage unit 9 divides the print data 95 into the without-security-setup data 210, the medium security level data 220, and the high security level data 230 based on the security setup 240 in the print data 95 in page units and stores them. The without-security-setup data 210 is PDL data for pages where the security has not been set up. The medium security level data 220 and the high security level data 230 are PDL data for pages where the security has been set up. This configuration can reduce a possibility of unauthorized access to PDL data of the print data 95 with pages with security setup, thus ensuring security.

With the image forming apparatus 1 of the disclosure, the output control unit 81 is configured to change the respective page numbers of the without-security-setup data 210 so as to be consecutive numbers. This configuration ensures reassigning page numbers for pages without security setup, which can be obtained by general users. This ensures that general users are less likely to notice existence of pages of high security level. This can reduce a risk of a leakage of confidential information to the third person.

The security setup unit 310 of the terminal 300 of the disclosure establishes security levels of the print data 95 in page units. The security setup unit 310 divides the print data 95 into the without-security-setup data 210, the medium security level data 220, and the high security level data 230 based on the established security levels. The security setup unit 310 transmits the data in an order of the without-security-setup data 210, the medium security level data 220, and the high security level data 230 to the image forming apparatus 1. This configuration can transmit the security-setup-sorted data of the print data 95 separately, store the security-setup-sorted data in the image forming apparatus 1, and immediately print the security-setup-sorted data starting from the without-security-setup data 210, thus ensuring reducing a risk of an information leakage.

With the image forming apparatus 1 of the disclosure, the output control unit 81 automatically deletes the medium security level data 220 and the high security level data 230 after an elapse of predetermined time. This can reduce a risk of an information leakage. With the image forming apparatus 1 of the disclosure, the output control unit 81 controls automatic output that prints data of security level of lower stage than the security level corresponding to the authenticated password after the password authentication. This ensures reducing a load of password input by the authorized user. Accordingly, the password setting is not validated through the entire document regardless of the security level, and the pages with low level of security level are all output after password input. This ensures reducing work of the authorized user, also ensuring shortening print time. With the image forming apparatus 1 of the disclosure, when a general user prints a page of high security level, the output control unit 81 notifies the authorized user of the unauthorized print. This ensures notification of unauthorized print of high security level data to the authorized user.

The above-described embodiment describes that the security is set up with the device driver of the terminal 300. However, this should not be construed in a limiting sense. For example, after the PDL data is transmitted to the image forming apparatus 1 and is stored in the storage folder, the security may be set up by accessing a Common Gateway Interface (CGI), ASP, or similar interface of a Web server included by the image forming apparatus 1 from the terminal 300. The embodiment describes that passwords are set in the medium security level and the high security level. However, a password can be set even in a security level lower than the medium security level. Different passwords can be set to every page in the same security level. The embodiment describes that "pages to be output" are changed corresponding to the security level. However, a print quality such as a resolution and color/monochrome selection can be changed, thus changing the print quality corresponding to the security level can expect reducing toner usage. The embodiment reassigns the page numbers corresponding to the without-security-setup data 210. However, the page numbers can be reassigned in units of security levels, and the printed matter can be output. For example, in the example of FIG. 5, the page numbers of the without-security-setup data 210 can be reassigned to the page numbers P1 to P2, and the page numbers of the with-security-setup data 220 and 230 can be reassigned to the page numbers P1 to P3. In the embodiment, when a predetermined condition such as "acquisition of a specific act" is met, printing of data with a higher security level is started. However, setting another predetermined condition is also possible. For example, the image forming apparatus 1 may start printing data with a higher security level by password input by the terminal 300 or a similar operation. Standby time until a predetermined act is obtained may be a fixed value. The standby time may also be any given value set by the user to the image forming apparatus 1 and stored in the account setting 90. The standby time may be changed according to a kind of the predetermined act. In the security print process with the image forming apparatus 1 of the disclosure, a driver (Driver Software) for a terminal such as a PC and a smart phone and dedicated Application Software can also achieve the process other than print.

The output control unit 81 may count respective color and monochrome outputs, may store in the storage unit 9 as log information, and may calculate a charge or a similar value.

The disclosure is also applicable to an information processing apparatus other than an image forming apparatus. That is, the disclosure may have a configuration using a server or a similar device to which a network scanner and a scanner are separately connected with a USB or a similar tool.

The configurations and operations of the embodiment are examples and these may be changed without departing from the scope of the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   a predetermined-act acquisition unit configured to obtain a predetermined act by a user;
   an output control unit configured to output pages of print data in which security has not been established among pages of print data in which security has been established in page units, and to permit output of the pages of print data in which security has been established, if the predetermined act has been obtained by the predetermined-act acquisition unit within a predetermined standby time;
   an image forming unit configured to print pages for which output has been permitted by the output control unit; and
   an output completion screen display unit configured to display an output completion screen after a page in which security has not been established is output; wherein
   the predetermined-act acquisition unit is configured to obtain an operation by a user on the output completion screen as the predetermined act.

2. The image forming apparatus according to claim 1, further comprising a security level setting unit configured to set up the security for the print data in page units.

3. The image forming apparatus according to claim 2, wherein:
   the security level setting unit is configured to establish multistage security levels as the security;
   the image forming apparatus further comprises a password authentication unit configured to authenticate passwords for pages for which a security level has been established; and
   the output control unit is configured to permit output of a page for which the security level has a stage equal to or lower than a stage of the established security level if a password has been authenticated by the password authentication unit after the predetermined act has been obtained.

4. The image forming apparatus according to claim 1, further comprising:
   a print data division unit configured to divide, based on the security setup, the print data into PDL data for pages in which security has not been established, and PDL data for pages in which security has been established;
   a security-setup-sorted data storage unit configured to store respectively the divided PDL data; and
   a list display unit configured to display a list of the PDL data, stored in the security-setup-sorted data storage unit, for which security has not been established.

5. The image forming apparatus according to claim 1, further comprising a page number change unit configured to change page numbers for pages in which security has not been established, so as to be consecutive numbers.

6. An image forming method, comprising:
   outputting pages of print data in which security has not been established among pages of print data in which security has been established in page units;
   obtaining a predetermined act by a user;
   permitting output of the pages of print data in which security has been established, if the predetermined act has been obtained within a predetermined standby time;
   printing pages for which output has been permitted; and
   displaying an output completion screen after a page in which security has not been established is output; wherein
   the obtaining obtains an operation by a user on the output completion screen as the predetermined act.

7. The image forming method according to claim 6, further comprising setting up the security for the print data in page units.

8. The image forming method according to claim 7, wherein:
   the setting up includes establishing multistage security levels as the security;
   the image forming method further comprises authenticating passwords for pages for which a security level has been established; and
   the permitting includes permitting output of a page for which the security level has a stage equal to or lower than a stage of the established security level if a password has been authenticated by a password authentication unit after the predetermined act has been obtained.

9. The image forming method according to claim 6, further comprising:
dividing, based on the security setup, the print data into PDL data for pages in which security has not been established, and PDL data for pages in which security has been established;
storing respectively the divided PDL data; and
displaying a list of the stored PDL data for which security has not been established.

10. The image forming method according to claim 6, further comprising changing page numbers for pages in which security has not been established, so as to be consecutive numbers.

11. A non-transitory computer-readable recording medium storing an image processing program, the image processing program causing an image forming apparatus to function as:
a predetermined-act acquisition unit that obtains a predetermined act by a user;
an output control unit that outputs pages of print data in which security has not been established among pages of print data in which security has been established in page units, and that permits output of the pages of print data in which security has been established, if the predetermined act has been obtained by the predetermined-act acquisition unit within a predetermined standby time; and
an image forming unit that prints pages for which output has been permitted by the output control unit; wherein
the image processing program further causes the image forming apparatus to function as an output completion screen display unit that displays an output completion screen after a page in which security has not been established is output, and
the predetermined-act acquisition unit obtains an operation by a user on the output completion screen as the predetermined act.

12. The non-transitory computer-readable recording medium according to claim 11, wherein the image processing program further causes an image forming apparatus to function as a security level setting unit that sets up the security for the print data in page units.

13. The non-transitory computer-readable recording medium according to claim 12, wherein:
the security level setting unit establishes multistage security levels as the security;
the image processing program further causes an image forming apparatus to function as a password authentication unit that authenticates passwords for pages for which a security level has been established; and
the output control unit permits the output of a page for which the security level has a stage equal to or lower than a stage of the established security level if a password has been authenticated by the password authentication unit after the predetermined act has been obtained.

14. The non-transitory computer-readable recording medium to claim 11, wherein the image processing program further causes an image forming apparatus to function as:
a print data division unit that divides, based on the security setup, the print data into PDL data for page in which security has not been established, and PDL data for pages in which security has been established;
a security-setup-sorted data storage unit that stores respectively the divided PDL data; and
a list display unit that displays a list of the PDL data, stored in the security-setup-sorted data storage unit, for which security has not been established.

\* \* \* \* \*